(12) United States Patent
Wang et al.

(10) Patent No.: US 8,256,733 B2
(45) Date of Patent: Sep. 4, 2012

(54) SUPPORT MECHANISM

(75) Inventors: Jin-Xin Wang, Shenzhen (CN); Gui-Li Yang, Shenzhen (CN); Jian Li, Shenzhen (CN); Xiao-Bo Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/241,982

(22) Filed: Sep. 23, 2011

(65) Prior Publication Data

US 2012/0012725 A1 Jan. 19, 2012

Related U.S. Application Data

(62) Division of application No. 12/548,406, filed on Aug. 26, 2009, now Pat. No. 8,056,877.

(30) Foreign Application Priority Data

May 25, 2009 (CN) .......................... 2009 1 0302587

(51) Int. Cl.
*F16M 11/00* (2006.01)

(52) U.S. Cl. ..... 248/414; 248/157; 248/161; 248/176.1; 248/917; 361/679.01

(58) Field of Classification Search ............... 248/176.1, 248/161, 157, 917–923; 361/679.01
See application file for complete search history.

(56) References Cited

U.S. PATENT DOCUMENTS

| 7,628,361 | B2 * | 12/2009 | Gan et al. | 248/132 |
| 7,681,845 | B1 * | 3/2010 | Chang | 248/161 |
| 7,708,243 | B2 * | 5/2010 | Wang et al. | 248/157 |
| 8,056,877 | B2 * | 11/2011 | Wang et al. | 248/414 |

* cited by examiner

*Primary Examiner* — Amy J. Sterling
(74) *Attorney, Agent, or Firm* — Altis Law Group, Inc.

(57) ABSTRACT

A support mechanism includes a bracket, a sliding member, a connecting unit, and an elastic member. The sliding member is slidably connected to the bracket. The connecting unit includes a first arm, a second arm pivotally connected to the first arm, a first pivot pivotally connecting a first ends of the first arm and the second arm, a second pivot pivotally connecting a second end of the first arm opposite to the first pivot and the bracket, a third pivot pivotally connecting a second end of the second arm opposite to the first pivot and the bracket, and a connecting piece sleeved on the first pivot. The elastic member is positioned between the connecting piece and the bracket. The sliding member resists the first arm and the second arm by an elastic force of the elastic member acting on the first arm and the second arm.

5 Claims, 6 Drawing Sheets

US 8,256,733 B2

SUPPORT MECHANISM

CROSS-REFERENCE TO RELATED APPLICATION

The present application is a divisional application of U.S. patent application Ser. No. 12/548,406, filed on Aug. 26, 2009, which claims all benefits accruing under 35 U.S.C. §119 from CN 200910302587.0, filed on May 25, 2009, the contents of which are hereby incorporated by reference.

BACKGROUND

1. Technical Field

The present disclosure generally relates to support mechanisms, particularly, to a support mechanism for a display device.

2. Description of Related Art

A frequently used display generally repositions along two axes. The display panel rotates along a horizontal axis to allow viewing from an appropriate angle. The display panel also rotates on a vertical axis.

However, when the display device is to be viewed from multiple angles of varying height, it may be inconvenient.

Therefore, a support mechanism with adjustable height is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
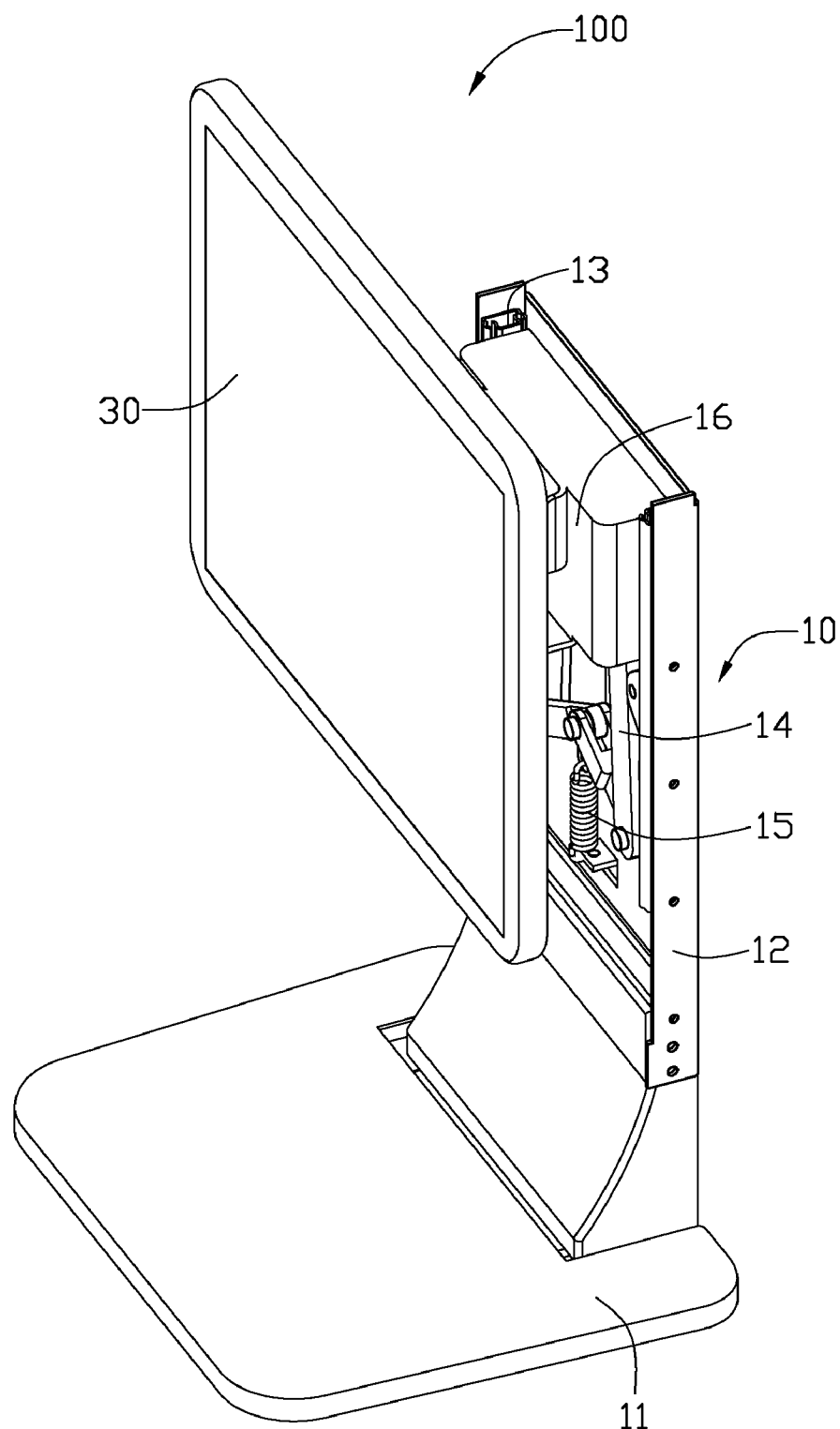
FIG. 1 is an assembled, isometric view of a first embodiment of a support mechanism, showing the support mechanism used in a display device to support a display panel, the support mechanism including a base, a bracket, two sliding members, a connecting unit, an elastic member, and a holding member.

Referring to FIG. 1, a first embodiment of a support mechanism 10 of the present disclosure utilized with a display device 100 is shown. Alternatively, the support mechanism 10 may be utilized with other devices such as lamps and webcams. The display device 100 includes the support mechanism 10 and a display panel 30 supported by the support mechanism 10.

The support mechanism 10 includes a base 11, a bracket 12 fixed to the base 11, two sliding members 13, a connecting unit 14, an elastic member 15, and a holding member 16. The base 11 contacts a surface to support the display device 100. The holding member 16 supports the display panel 30.

Figure 2:
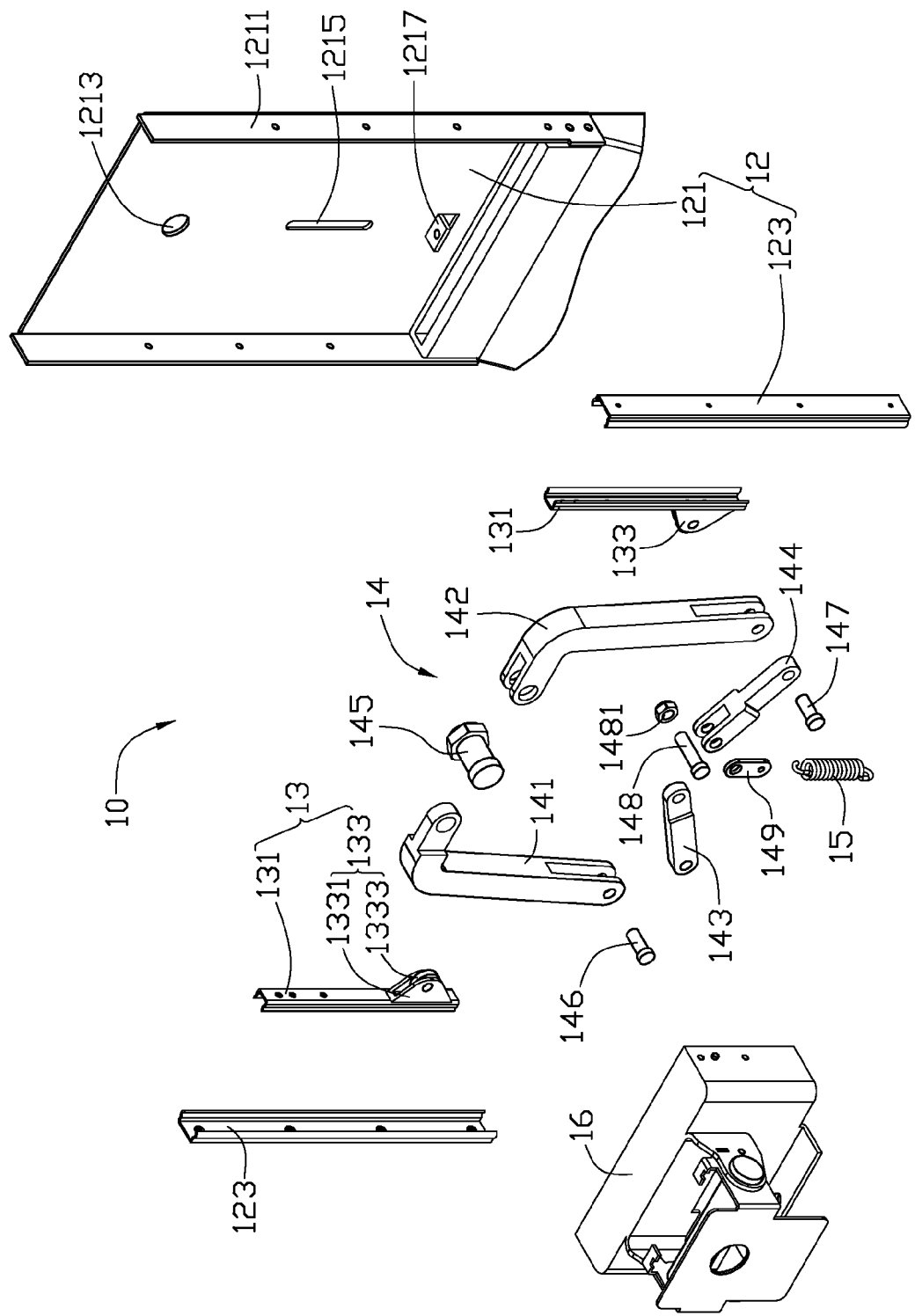
FIG. 2 is an exploded, isometric view of the support mechanism of FIG. 1 without the base.

Referring also to FIG. 2, the bracket 12 includes a supporting member 121 and two outer slide tracks 123. The supporting member 121 forms two opposite connecting portions 1211 at opposite sides and a fixing protrusion 1217 between the connecting portions 1211. The supporting member 121 defines a pivot hole 1213 and a guiding slot 1215. The guiding slot 1215 extends along an axis substantially parallel to the outer slide tracks 123. The outer slide tracks 123 are fixed on the connecting portions 1211.

The sliding member 13 includes an inner slide track 131 to engage with the outer slide track 123 and a resisting portion 133. The resisting portion 133 includes a pivoting portion 1331 and a wheel 1333 pivotally connected to the pivoting portion 1331.

The connecting unit 14 includes a first arm 141, a second arm 142, a third arm 143, a fourth arm 144, a first pivot 145 pivotally connecting an end of the first arm 141 and an end of the second arm 142, a second pivot 146 pivotally connecting the other end of the first arm 141 and an end of the third arm 143, a third pivot 147 pivotally connecting the other end of the second arm 142 and an end of the fourth arm 144, a fourth pivot 148 pivotally connecting the other end of the third arm 143 and the other end of the fourth arm 144, and a connecting piece 149 sleeved on the fourth pivot 148. The first arm 141 has a resisting surface 1411 and the second arm 142 has a resisting surface 1421.

Figure 3:
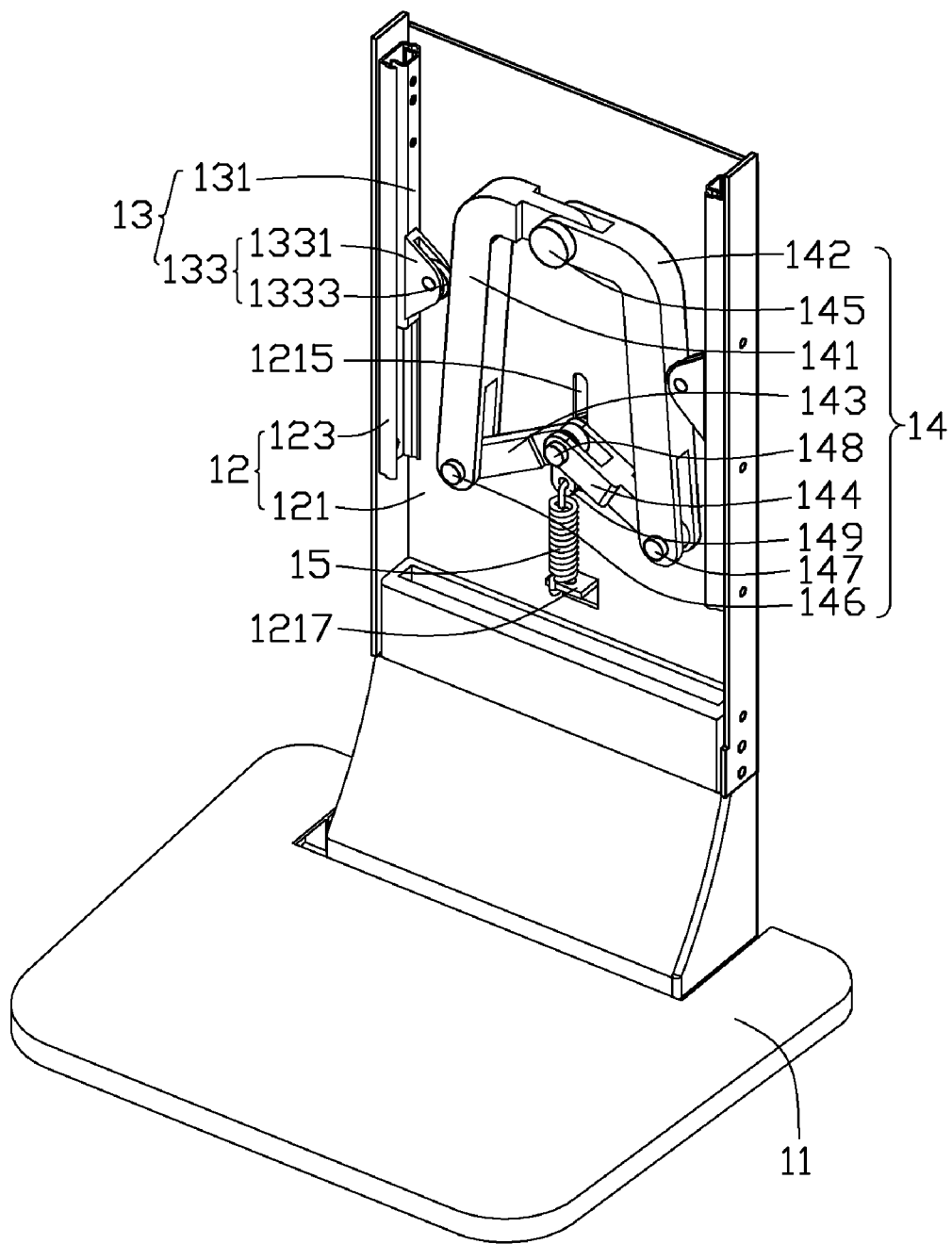
FIG. 3 is an assembled, isometric view of the support mechanism of FIG. 1.

Referring to FIG. 3, the first arm 141 and the second arm 142 have similar structure and are approximately L-shaped. The first pivot 145 runs through the pivot hole 1213 of the bracket 12, the first arm 141 and the second arm 142. Ends of the first pivot 145 may be riveted to form flanges, thus retaining the bracket 12, the first arm 141 and the second arm 142 in place. The fourth pivot 148 runs through the connecting piece 149, the third arm 143 and the fourth arm 144, and slidably extends in the guiding slot 1215. A nut 1481 is fixed at an end of the fourth pivot 148.

In the illustrated embodiment, the elastic member 15 is a columnar extension spring, but may alternatively be an extension piece or rubber post, or other elastic components. Opposite ends of the elastic member 15 are connected to the connecting piece 149 and the fixing protrusion 1217. The holding member 16 is fixed to the inner slide tracks 131 of the sliding members 13. The holding member 16 and the sliding members 13 are slidable on the bracket 12. The wheels 1333 resist the first arm 141 and the second arm 142. The resisting surface 1411 of the first arm 141 and the resisting surface 1421 of the second arm 142 are oblique to the sliding direction of the sliding members 13.

Figure 4:
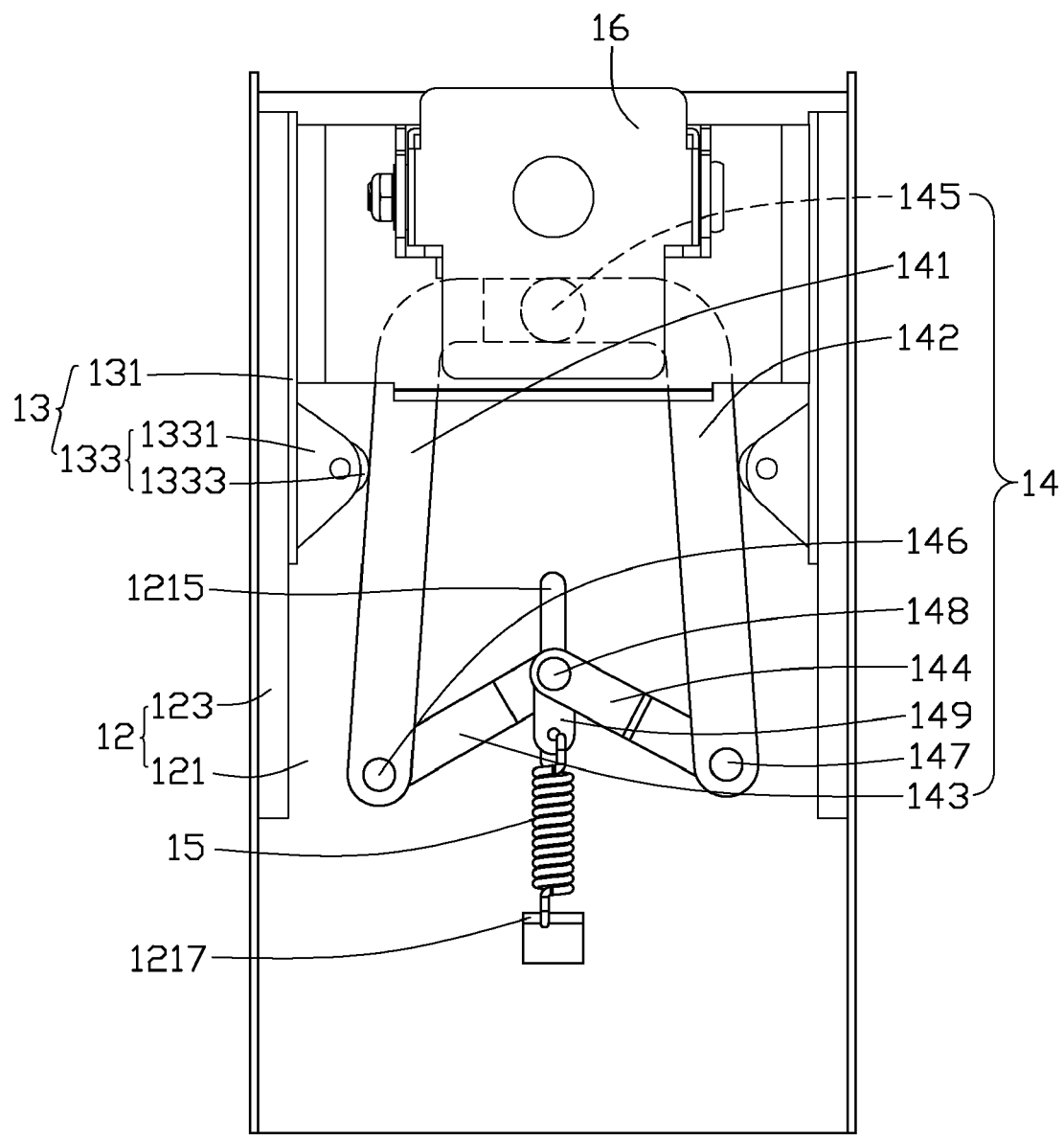
FIG. 4 is a plan view of the support mechanism of FIG. 1, showing the sliding members at a top end of the bracket.

Referring to FIG. 4, when the sliding members 13 and the holding member 16 are at a top portion of the bracket 12, a resisting force between the wheel 1333 and the first arm 141, and the wheel 1333 and the second arm 142 are relatively small. An angle defined between the first arm 141 and the second arm 142, and an angle defined between the third arm 143 and the fourth arm 144 are relatively large. The fourth pivot 148 is near a bottom end of the guiding slot 1215 of the bracket 12. The elastic member 15 is either in a free state or extended.

Figure 5:
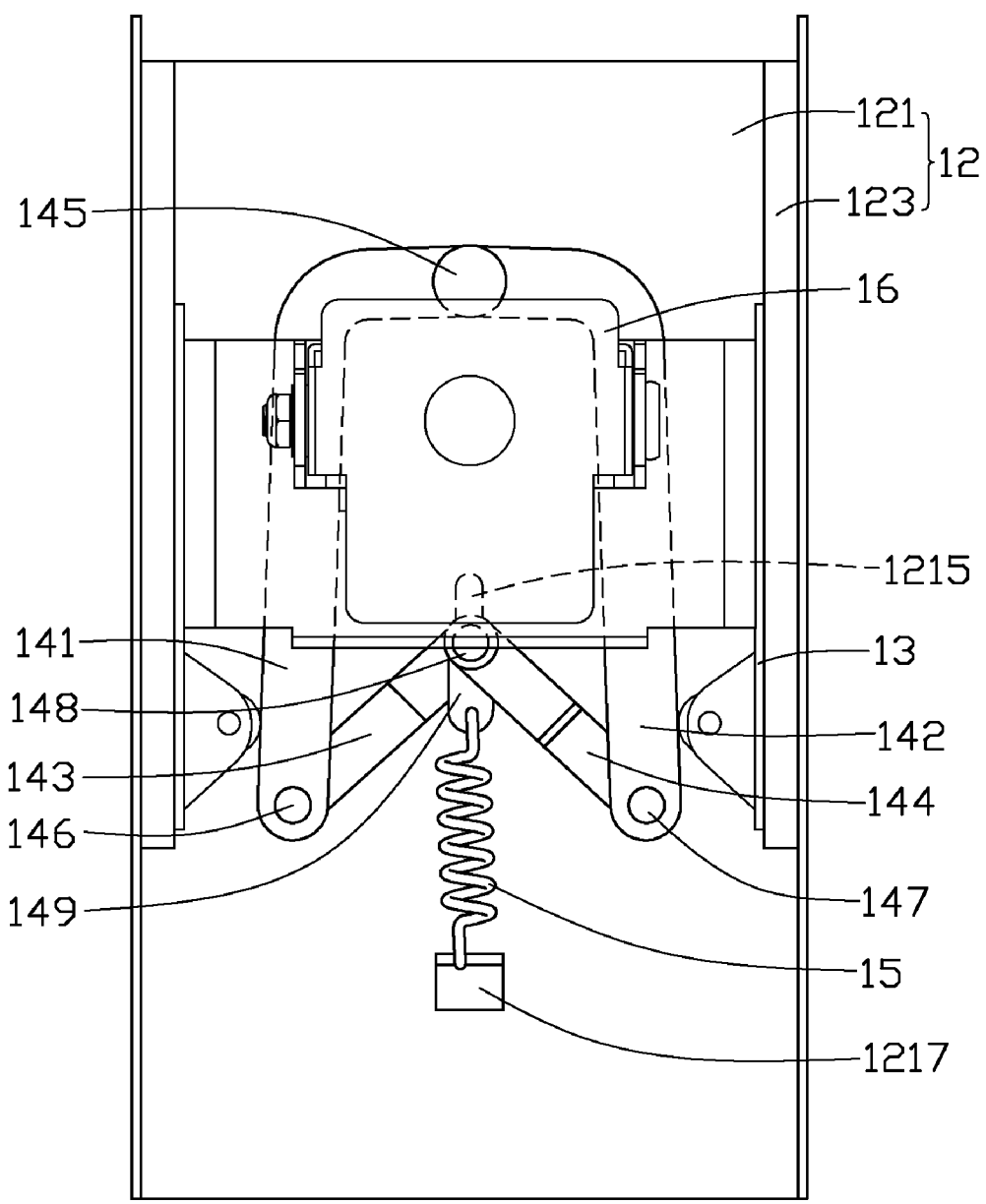
FIG. 5 is a plan view of the support mechanism of FIG. 1, showing the sliding members at a bottom end of the bracket.

Referring to FIG. 5, to lower the display panel 30, an external force applied on the display panel 30 slides the sliding members 13 and the holding member 16 relative to the bracket 12 toward the base 11. The wheels 1333 resist the first arm 141 and the second arm 142 to rotate around the first pivot 145, thus the end of the first arm 141 away from the first pivot 145 and the end of the second arm 142 away from the first pivot 145 move toward each other. The third arm 143 and the fourth arm 144 are urged to rotate around the second pivot 146 and the third pivot 147 respectively. The fourth pivot 148 slides in the guiding slot 1215 towards the top end. The elastic member 15 is extended.

To elevate the display panel 30, another external force applied on the display panel 30 slides the sliding members 13 and the holding member 16 relative to the bracket 12 away from the base 11. The first, second, third, and fourth arms 141, 142, 143, 144 rotate accordingly. The fourth pivot 148 slides in the guiding slot 1215 toward the bottom end. The elastic member 15 resets to its original state.

The display panel 30 together with the sliding members 13 and the holding member 16 can assume any position because of the resisting force between the wheel 1333 and the first arm 141 and between the wheel 1333 and the second arm 142 during adjustment of the display panel 30. The elastic force of the elastic member 15 increases when the display panel 30 is lowered. A counterforce applied on the wheels 1333 increases accordingly. Therefore, when the display panel 30 is lowered, a greater external force must be applied to lower the display panel 30.

When the display panel 30 is lowered, a direction of the external force to lower the display panel 30 is against a direction of the counterforce, therefore, the external force should be relatively large. When elevating the display panel 30, a direction of another external force to elevate the display panel 30 is the same as the direction of the counterforce, therefore, this external force is relatively small. This makes people can lower or elevating the display panel 30 conveniently and easily.

In the support mechanism 10, most of the weight of the display panel 30 is borne on the arms of the connecting unit 14. Little weight of the display panel 30 is borne on the elastic member 15. Therefore, the elastic member 15 does not wear out quickly. A slide range of the sliding members 13 and the holding member 16 is determined by the outer slide track 131 and the inner slide track 123, rather than the elastic member 15, thus the slide range can remain unchanged, even over a long time.

Alternatively, the connecting piece 149 may be omitted, in which case an end of the elastic member 15 is connected to any of the third arm 143, the fourth arm 144, or the fourth pivot 148. The wheels 1333 may be omitted, in which case the pivoting portions 1331 resist the first arm 141 and the second arm 142.

Figure 6:
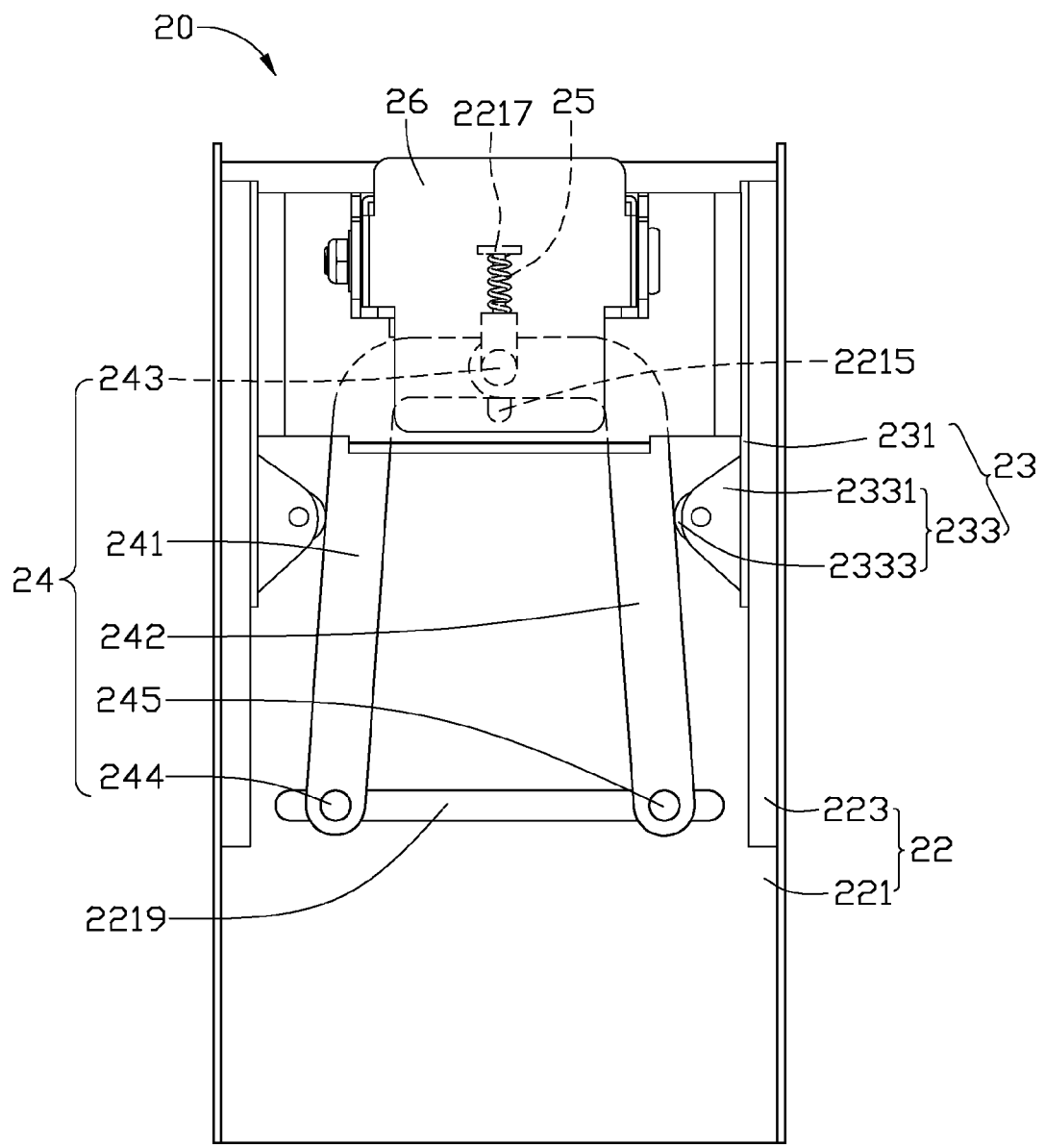
FIG. 6 is a plan view of a second embodiment of a support mechanism, showing two sliding members at a top end of the bracket.

Referring to FIG. 6, a second embodiment of the support mechanism 20 is similar to the first embodiment of the support mechanism 10. The support mechanism 20 includes a bracket 22, two sliding members 23, a connecting unit 24, an elastic member 25, and a holding member 26. A structure of the bracket 22 and the sliding members 23 is similar to structure of the bracket 12 and the sliding members 13. The bracket 22 includes a supporting member 221 and two outer slide tracks 223. The sliding member 23 includes an inner slide track 231 and a resisting portion 233. The resisting portion 233 includes a pivoting portion 2331 and a wheel 2333 pivotally connected to the pivoting portion 2331. The bracket 22 defines a first guiding slot 2215 and a second guiding slot 2219 substantially perpendicular to each other, and forms a fixing protrusion 2217 at a top portion of the bracket 22.

The connecting unit 24 includes a first arm 241, a second arm 242, a first pivot 243 pivotally connecting ends of the first arm 241 and the second arm 242, a second pivot 244 pivotally connecting the other end of the first arm 241 opposite to the first pivot 243 and the bracket 22, a third pivot 245 pivotally connecting the other end of the second arm 242 opposite to the first pivot 243 and the bracket 22, and a connecting piece 246. The connecting piece 246 is sleeved on the first pivot 243. The holding member 26 is fixed to the inner slide tracks 231 of the sliding members 23. Ends of the elastic member 25 are connected to the fixing protrusion 2217 and the connecting piece 246. In the illustrated embodiment, the elastic member 25 is a compression spring. The second pivot 244 and the third pivot 245 are slidable in the second guiding slot 2219, and the first pivot 243 is slidable in the first guiding slot 2215.

When the display panel 30 moves downwards, the wheels 2333 resist the first arm 241 and the second arm 242 to rotate around the first pivot 243, thus the ends of the first arm 141 and the second arm 142 away from the first pivot 145 move toward each other. The second pivot 244 and the third pivot 245 slide in the second guiding slot 2219 and move toward each other, and the first pivot 243 slides in the first guiding slot 2215 towards the top end. The elastic member 25 is compressed. When the display panel 30 moves upwards, the second pivot 244 and the third pivot 245 move away from each other, and the first pivot 243 slides in the first guiding slot 2215 towards the bottom end. The elastic member 25 resets to its original state.

Alternatively, the second guiding slot 2219, the second pivot 244, and the third pivot 245 may be omitted. Instead, the bracket 22 forms a guiding portion; ends of the first arm 241 and the second arm 242 resist the guiding portion and slide along the guiding portion.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support mechanism, comprising:
    a bracket defining a first guiding slot and a second guiding slot substantially perpendicular to each other;
    a sliding member slidably connected to the bracket;
    a connecting unit comprising a first arm, a second arm pivotally connected to the first arm, a first pivot pivotally connecting first ends of the first arm and the second arm, a second pivot pivotally connecting a second end of the first arm opposite to the first pivot and the bracket, a third pivot pivotally connecting a second end of the second arm opposite to the first pivot and the bracket, and a connecting piece sleeved on the first pivot; and
    an elastic member positioned between the connecting piece and the bracket;
    wherein the sliding member resists the first arm and the second arm by an elastic force of the elastic member acting on the first arm and the second arm.

2. The support mechanism of claim 1, wherein the bracket forms a fixing protrusion at a top portion of the bracket, and ends of the elastic member are connected to the fixing protrusion and the connecting piece.

3. The support mechanism of claim 1, further comprising another sliding member, each of the sliding members comprises an inner slide track, and the bracket comprises a supporting member and two outer slide tracks engaging with two inner slide tracks of the two sliding members.

4. The support mechanism of claim 3, further comprising a holding member fixed to the inner slide tracks of the sliding members.

5. The support mechanism of claim 1, wherein the elastic member comprises a compression spring.

* * * * *